(12) United States Patent
Bonden et al.

(10) Patent No.: US 9,762,807 B1
(45) Date of Patent: Sep. 12, 2017

(54) USING DISPLAY LIGHT TO IMPROVE FRONT FACING CAMERA PERFORMANCE

(71) Applicant: Intel Corporation, Santa Clara, CA (US)

(72) Inventors: Marko Bonden, Tampere (FI); Mikko Ollila, Tampere (FI); Jani Penttila, Lempaala (FI)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 15/066,220

(22) Filed: Mar. 10, 2016

(51) Int. Cl.
| | |
|---|---|
| *H04N 5/235* | (2006.01) |
| *H04N 5/232* | (2006.01) |
| *H04N 9/04* | (2006.01) |
| *H04N 9/73* | (2006.01) |

(52) U.S. Cl.
CPC ....... *H04N 5/2354* (2013.01); *H04N 5/23293* (2013.01); *H04N 9/045* (2013.01); *H04N 9/735* (2013.01)

(58) Field of Classification Search
CPC .... H04N 5/2354; H04N 5/2351; H04N 5/351; H04N 5/2256; H04N 5/222; H04N 5/225; H04N 5/238; H04N 5/23219; H04N 9/04; H04N 9/735; H04N 5/23293; H04N 9/045; G03B 17/02; G03B 7/16; G03B 7/17; G03B 15/02; G03B 15/05; G03B 15/03; G03B 2215/0589; H05B 33/0863; H05B 33/0869; F21V 23/04; F21V 23/0442; F21Y 2101/00; F21W 2131/406
USPC ...................................................... 348/223.1
See application file for complete search history.

(56) References Cited

U.S. PATENT DOCUMENTS

| | | | | |
|---|---|---|---|---|
| 7,764,880 | B2* | 7/2010 | Hamada | G03B 7/16 348/371 |
| 8,199,249 | B2 | 6/2012 | Ciudad et al. | |
| 8,604,708 | B2* | 12/2013 | Liaw | G03B 7/16 315/241 P |
| 8,953,095 | B2* | 2/2015 | Liaw | G03B 7/16 348/258 |
| 9,609,222 | B1* | 3/2017 | Rowles | H04N 5/23293 |
| 2008/0199172 | A1* | 8/2008 | Hamada | G03B 7/16 396/157 |
| 2009/0273661 | A1* | 11/2009 | Mauchly | H04N 5/2256 348/14.08 |
| 2010/0194961 | A1* | 8/2010 | Patel | H04N 5/20 348/333.01 |
| 2013/0154514 | A1* | 6/2013 | Liaw | G03B 7/16 315/307 |

(Continued)

FOREIGN PATENT DOCUMENTS

KR 1020130099620 9/2013

OTHER PUBLICATIONS

International Search Report and Written Opinion for International Patent Application No. PCT/US2017/015612, dated May 23, 2017.

*Primary Examiner* — Pritham Prabhakher
(74) *Attorney, Agent, or Firm* — Green, Howard & Mughal LLP

(57) ABSTRACT

Techniques related to improved front facing camera performance using display light during exposure of a scene are discussed. Such techniques may include providing, via a display device, exposure light during exposure of the scene such that providing the exposure light includes setting regions of the display device to different colors during exposure.

21 Claims, 8 Drawing Sheets

(56) References Cited

U.S. PATENT DOCUMENTS

| | | |
|---|---|---|
| 2015/0002735 A1 | 1/2015 | Moskovchenko |
| 2015/0049211 A1 | 2/2015 | Lim |
| 2015/0201130 A1 | 7/2015 | Cho et al. |
| 2016/0037042 A1* | 2/2016 | Zhang ................ H04N 5/23293 348/370 |
| 2016/0094763 A1* | 3/2016 | Patel ................... H04N 5/2256 348/333.13 |
| 2016/0212314 A1* | 7/2016 | Sanchez ................. F21S 10/00 |
| 2016/0212318 A1* | 7/2016 | Masuoka ........... H04N 5/23293 |
| 2016/0337564 A1* | 11/2016 | Fournier ............... F21V 14/003 |

\* cited by examiner

USING DISPLAY LIGHT TO IMPROVE FRONT FACING CAMERA PERFORMANCE

BACKGROUND

Obtaining images via cameras or cameras integrated within devices such as laptops, tablets, or mobile phones or the like is very common. For example, such devices may include a user facing camera, which may not have a corresponding light source (e.g., flash) for casting light on the user or other subjects of a scene during exposure. For example, such devices may also include a backside camera having an accompanying flash to cast light on the object or scene being photographed.

Providing an accompanying flash (e.g., an LED flash or the like) to the user facing camera may be mechanically difficult with current form factor of devices, particularly in mobile phones. Furthermore, such an accompanying flash to the user facing camera, if provided, may add additional cost and may not be visually appealing to users.

As such, existing techniques do not provide suitable exposure for subjects by a user or front facing camera. It is with respect to these and other considerations that the present improvements have been needed. Such improvements may become critical as the desire to obtain aesthetically pleasing images in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
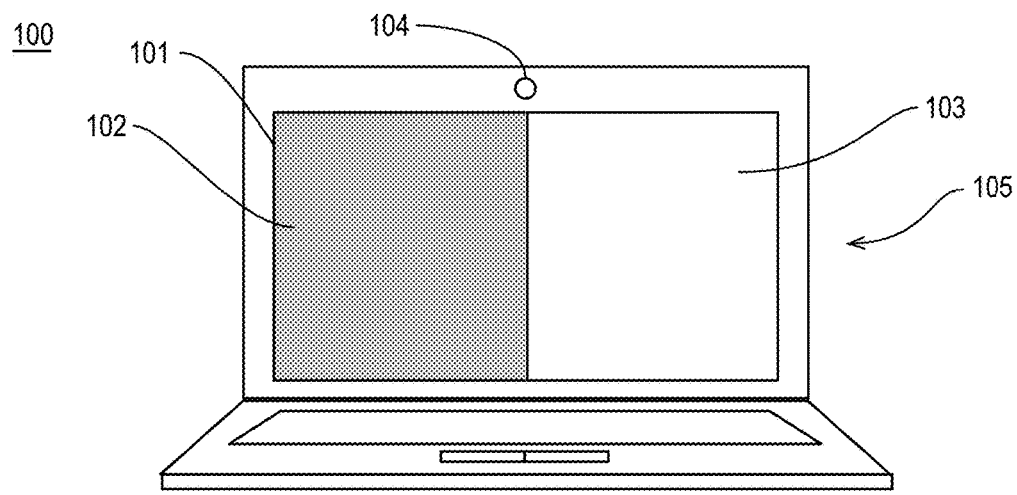
FIG. 1 is an illustrative diagram of a device for capturing images with exposure light provided by a display device.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as cameras, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Methods, devices, systems, and articles are described herein related to improved front facing camera performance using display light during exposure of a scene and, in particular, to providing exposure light by setting a region of the display device to a first color and another region of the display device to a second color.

As described above, obtaining images via imaging devices (e.g., cameras or cameras integrated within devices such as smartphones or the like) may be common. In some instances, the device may include a camera that faces a direction that is the same as a display direction of a display of the device. For example, such a camera may be characterized as a front facing camera, a user facing camera, or the like. Such cameras may not typically include a corresponding light source (e.g., flash) for casting light on the user or other subjects of a scene during exposure. In some conditions, particularly low light conditions, it may be difficult to attain an aesthetically pleasing image without such a corresponding light source. Furthermore, it may be advantageous to perform white balance or the like in such imaging contexts.

In some embodiments discussed herein, during image capture, capturing an image of a scene may include providing, via a display device, exposure light during the exposure such that providing the exposure light may include setting regions of the display device to different colors. For example, a first region may be set to a first color and a second region of the display device may be set to a second color during the exposure. Furthermore, other regions of the display device may be set to the same or other colors and/or patterns or the like may be provided as is discussed further herein. For example, prior to image capture, the colors for the regions and/or patterns may be determined during a pre-exposure processing or the like. For example, determining the colors may include performing a white balance analysis, a skin color adjustment, or the like. During image capture, for backlit display devices such as liquid crystal displays with light emitting diode backlight, providing the exposure light may include setting the colors via a liquid crystal panel component of the liquid crystal display and providing the exposure light by a backlight component of the liquid crystal display through the liquid crystal panel component. For self light emitting display devices, such as organic light emitting diode displays, setting the colors may be provided by the exposure light as emitted by the self light emitting display device. Furthermore, in some embodiments, providing the exposure light may include overdriving a light source of the display device to provide a pulsed exposure light during the exposure. For example, the pulsed exposure light has an exposure intensity that exceeds a maximum display intensity of the light source.

The techniques discussed herein may provide improved image quality in challenging lighting conditions (e.g., low light conditions) and improved white balance and/or skin tone reproduction. For example, the discussed techniques may use a light source in a display device (e.g., backlight light emitting diodes or the like) to increase emitted light during image capture (e.g., triggering/shutter of a user facing camera or the like). Furthermore, the display device (e.g., a liquid crystal display panel of the display device) may be used to adjust the color curvature of the light either constantly or spatially around the display device. As discussed, the white balance compensation and/or skin tone enhancement may be performed using a liquid crystal display (LCD) with backlight or using a self light emitting display device such as an organic light emitting diode (OLED) display device. Furthermore, user experience may be enhanced by providing display content during image capture. Such display content may be provided by providing light sources of a display device in chains separately driven by driver circuitry as is discussed further herein.

FIG. 1 is an illustrative diagram of a device 100 for capturing images with exposure light provided by a display device, arranged in accordance with at least some implementations of the present disclosure. As shown in FIG. 1, device 100 may include a display device 101 and a camera 104. In the example of FIG. 1, device 100 is illustrated as a laptop computer. However, device 100 may include any suitable form factor device having display device 101 and camera 104. For example, device 100 may be a camera, a smartphone, an ultrabook, a tablet, a wearable device, a monitor, or the like.

As shown, camera 104 may not have a corresponding flash in device 100. As will be discussed further herein, during an exposure of a scene, display device 101 may provide an exposure light to support image capture by camera 104. Display device 101 and camera may be oriented in any suitable manner. As shown, in an embodiment, display device 101 may have a display direction or facing direction that is substantially aligned with a facing direction or image capture direction of camera 104. Furthermore, camera 104 may be characterized as a front facing camera (e.g., as it faces a front of device 100), a user facing camera (e.g., as a user operating device 100 would face camera 104), or the like.

As will be appreciated, camera 104 may be capable of attaining an image of a scene (not shown) that camera 104 is facing. The scene may include any suitable scene viewed by camera 104. For example, camera 104 may face a user, multiple users, or the like, or a user may hold device 100 such that camera faces a scene. During exposure, camera may attain an image (e.g., a digital image) of the scene. Furthermore, during exposure, display device 101 may provide an exposure light during the exposure. For example, the display device 101 may light up or the like during the exposure. For example, during the exposure, display device 101 may be overdriven or the like to provide a pulsed exposure light during the exposure such that the pulsed exposure light has an exposure intensity that exceeds a maximum display intensity of display device 101. Such pulsed exposure light may provide for improved performance during image capture. Such pulsed exposure light or corresponding techniques may be characterized as a boosted exposure light, a boosted exposure light, an overdrive exposure light, or the light. Furthermore, the pulsed exposure light may be synchronized with image capture by camera 104 such that the pulsed exposure light is provided during image capture (e.g., during exposure).

Furthermore, during exposure, multiple colors of light may be provided via display device 101 to improve imaging performance. For example, in a pre-exposure operation, an exposure display pattern 105 may be determined to improve image capture of the scene. For example, exposure display pattern 105 may provide a display pattern or image or the like that may be provided during image capture. For example, exposure display pattern 105 may include two or more colors to be provided in a particular pattern during image capture. As shown in the illustration of FIG. 1, during image capture, display device 101 may provide exposure display pattern 105 such that in a first region 102 of display device 101, a first color may be provided (illustrated in gray in FIG. 1) and in a second region 103 of display device 101, a second color may be provided (illustrated in white in FIG. 1). For example, exposure display pattern 105 provided during exposure may provide improved image capture.

In FIG. 1, exposure display pattern 105 includes two colors in a pattern having first region 102 on one side of display device 101 and second region 103 on another side of display device 101. However, the colors provided by exposure display pattern 105 may include any suitable colors available via display device 101. Furthermore, exposure display pattern 105 may include any number of regions of any number of colors, any patterns (e.g., gratings, textures, or the like). For example, exposure display pattern 105 may include any patterns, imagery, or the like available for presentation by display device 101. In an embodiment, exposure display pattern 105 may include a grid of regions each having a selected color. The grid may be of any granularity such as a 2×2 grid, a 4×4 grid, or the like. Furthermore, exposure display pattern 105 may include regions of any shapes such as squares, rectangles, circles, or the like. In an embodiment, exposure display pattern 105 may include color transition patterns such that color blending may be provided across exposure display pattern 105 (e.g., transitions between regions may not be distinct lines as shown).

As discussed, during exposure of a scene, camera 104 may capture an image of the scene and during the image capture, display device 101 may provide exposure light such that the exposure light includes exposure display pattern 105 during exposure. Exposure display pattern 105 may be determined or set during pre-image capture operations and may provide improved image capture by camera 104. As discussed, exposure display pattern 105 may include any suitable pattern, image, or the like having any suitable colors. In an embodiment, exposure display pattern 105 may include a single color provided over all of display device 101. In an embodiment, exposure display pattern 105 may divide display device 101 into a number of regions in any suitable pattern (e.g., in halves, in quarters, in a grid or the like) and exposure display pattern 105 may provide a suitable color for each region. In an embodiment, exposure display pattern 105 may be a more complex image incorporating information from the scene such that exposure display pattern 105 may include regions corresponding to tracked or detected objects in the scene, or the like. Furthermore, exposure display pattern 105 may provide regions of distinct colors or patterned regions of colors such as gradient patterns (e.g., increasing in intensity or color across a region in any direction) or the like.

Figure 2:
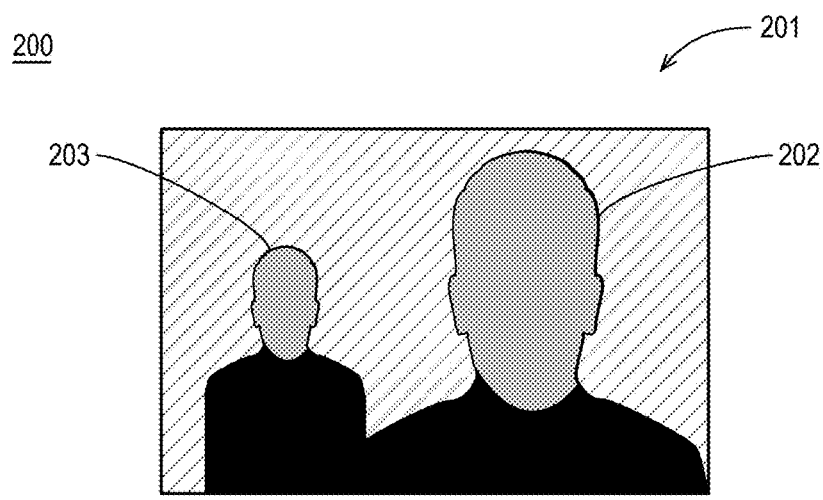
FIG. 2 illustrates an example captured image.

FIG. 2 illustrates an example captured image 200, arranged in accordance with at least some implementations of the present disclosure. As shown in FIG. 2, captured image 200 may provide an image of a scene 201 including a subject 202 and a subject 203. However, captured image 200 may include any suitable objects, subjects, or the like. In the example of captured image 200, subject 202 may be closer to the camera and subject 203 may be further from the camera attaining captured image 200. Furthermore, subject 202 may be on one side of scene 201 and subject 203 may be on another side of scene 201. In such an example scene, the image capture of subjects 202, 203 may be altered based on exposure display pattern 105. For example, by providing color in region 102 of exposure display pattern 105 (please refer to FIG. 1), the color of subject 202 may be altered. Similarly, by providing color in region 103 of exposure display pattern 105, the color of subject 203 may be altered. For example, by monitoring scene 202 prior to exposure, device 100 may alter exposure display pattern 105 during exposure and image capture by camera 104 to improve imaging performance. For example, if scene 201 was altered such that subject 203 was removed or was a background object such as a nature scene, providing a color in region 102 that may enhance skin tones (e.g., red tones) may be advantageous for attaining an image of subject 202 and providing a white color in region 103 or a color that enhances green tones or he like may be advantageous.

As will be appreciated, scene 201 may include a wide range of subjects, objects, and the like. During a pre-exposure analysis of scene 201, device 100 may generate exposure display pattern 105 for implementation during exposure of the scene. Such pre-exposure processing may include white balance operations, skin tone detection operations, object recognition and/or object tracking operations, or the like to generate exposure display pattern 105. For example, device 100 may attain images via camera 104 during pre-exposure and such images may be processed and analyzed or the like to generate exposure display pattern 105 during exposure as is discussed further herein. For example, in some lighting conditions, a subject may not be evenly illuminated such that the light sources on different sides of the subject may vary or the like (e.g., a subject may have sunlight on one side and lighting from a light bulb on the other). Using the techniques discussed herein, exposure light may be provided (e.g., emitted from the display device) during image capture to spatially adjust or compensate for such illumination imbalances or the like so optimal image quality may be attained.

Returning to FIG. 1, as discussed, display device 101 may provide exposure light during exposure of a scene. Display device 101 may include any suitable display device that may provide such exposure light. For example, display device 101 may be a self light emitting display device such that no backlight is required for providing the exposure light. For example, display device 101 may be an organic light emitting diode display. In other examples, display device 101 may include a backlight for providing light and an imaging panel or the like to alter the light to provide the exposure light. For example, display device 101 may be a liquid crystal display device having a backlight component (e.g., including a backlight light having emitting diodes) and a liquid crystal panel component over the backlight component to provide the color regions or images or the like discussed with respect to exposure display pattern 105.

Figure 3:
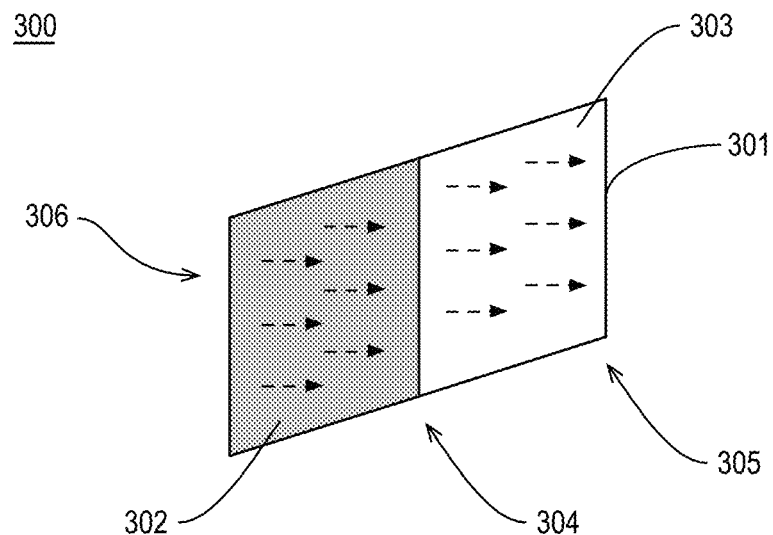
FIG. 3 illustrates an example self light emitting display device during exposure.

FIG. 3 illustrates an example self light emitting display device 300 during exposure, arranged in accordance with at least some implementations of the present disclosure. As shown in FIG. 3, self light emitting display device 300 may include a self light emitting panel 301. Self light emitting display device 300 may include any suitable display device that emits and patterns light without use of a backlight or other light source. For example, self light emitting display device 300 may be an organic light emitting diode display device or the like. As shown, during exposure, self light emitting panel 301 of self light emitting display device 300 may provide or set an exposure display pattern 306 such that a first region 302 provides a first color (e.g., illustrated in gray in FIG. 3) and a second region 303 provides a second color (e.g., illustrated in white). Exposure display pattern 306 is illustrated as having two regions of different colors, however, exposure display pattern 306 may include any exposure display pattern as discussed herein.

Furthermore, as shown, during exposure, self light emitting panel 301 of self light emitting display device 300 may emit exposure light 304, 305 as set by exposure display pattern 306. For example, exposure light 304 may be set or provided in a first color and exposure light 305 may be set or provided in a second color. As will be appreciated, exposure light 304, 305 may correspond to exposure display pattern 306 and may include any suitable pattern, image, or the like as defined by exposure display pattern 306. For example, in the context of self light emitting display device 300, exposure light 304, 305 may be provided during exposure such that providing exposure light 304, 305 may include setting first region 302 of self light emitting display device 300 to a first color and setting second region 303 of self light emitting display device 300 to a second color during the exposure. Furthermore, setting first region 302 to the first color and setting second region 303 to the second color during the exposure may include providing the first and second colors via self light emitting display device 300.

As is discussed further herein, exposure light 304, 305 may be overdriven such that exposure light 304, 305 may provide a pulsed exposure light having an exposure intensity that exceeds a maximum display intensity of self light emitting display device 300. Furthermore, as discussed further herein, regions may be provided in self light emitting display device 300 such that one or more regions provide exposure light 304, 305 during exposure and one or more other regions provide display content (e.g., a continued display of the scene, exposure data, or the like) during exposure.

Figure 4:
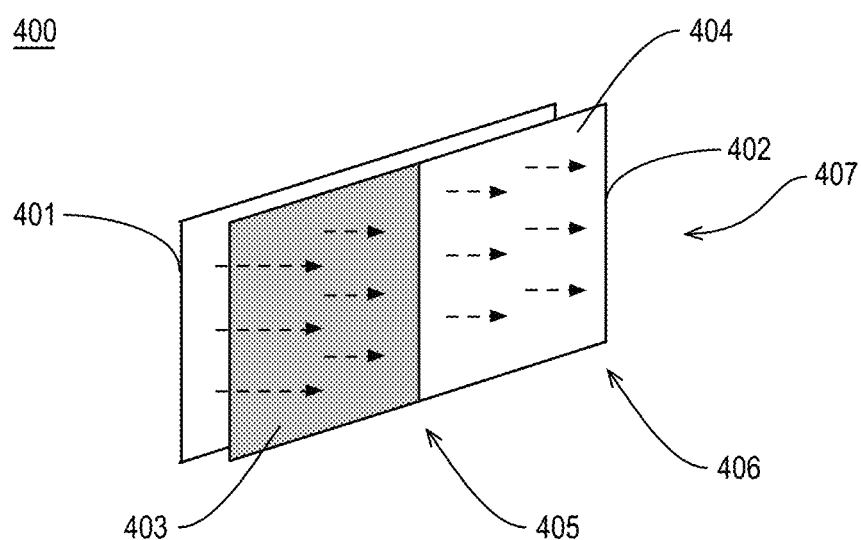
FIG. 4 illustrates an example backlit display device during exposure.

FIG. 4 illustrates an example backlit display device 400 during exposure, arranged in accordance with at least some implementations of the present disclosure. Backlit display device 400 may include any type of display device such as a liquid crystal display or the like. As shown in FIG. 4, backlit display device 400 may include a backlight component 401 and a display component 402. Backlight component 401 may include any suitable display component or components that provides lighting for backlit display device 400. For example, backlight component 401 may include a grid of light emitting diodes (e.g., light emitting diodes provided on a 1 or 2 mm grid or less) or the like. Display component 402 may include any suitable component for providing a pattern or image via backlit display device 400. For example, display component 402 may include a liquid crystal panel component or the like for providing an image or pattern that may be illuminated by light provided by backlight component 401. In an embodiment, backlit display device 400 may be a liquid crystal display, backlight component 401 may include light emitting diodes, and display component 402 may be a liquid crystal display component.

As shown, during exposure, backlight component 401 of backlit display device 400 may provide a light source and display component 402 of backlit display device 400 may provide or set an exposure display pattern 407 such that a first region 403 provides a first color (e.g., illustrated in gray in FIG. 4) and a second region 404 provides a second color (e.g., illustrated in white). Exposure display pattern 407 is illustrated as having two regions of different colors, however, exposure display pattern 407 may include any exposure display pattern as discussed herein.

Furthermore, as shown, during exposure, backlit display device 400 may emit exposure light 405, 406 as set by exposure display pattern 407. For example, exposure light 405 may be set or provided in a first color and exposure light 406 may be set or provided in a second color. Exposure light 405, 406 may correspond to exposure display pattern 407 and may include any suitable pattern, image, or the like as defined by exposure display pattern 407. For example, in the context of backlit display device 400, exposure light 405, 406 may be provided during exposure such that providing exposure light 405, 406 may include setting first region 403 of display component 402 to a first color and setting second region 404 of self display component 402 to a second color during the exposure. Furthermore, backlight component 401 may provide light, which may be altered by display component 402 to provide exposure light 405, 406.

As is discussed further herein, exposure light 405, 406 (e.g., the light provided by backlight component 401) may be overdriven such that exposure light 405, 406 may provide a pulsed exposure light having an exposure intensity that exceeds a maximum display intensity of backlit display device 400. Furthermore, as discussed further herein, regions may be provided in backlit display device 400 (e.g., via backlight component 401 and display component 402) such that one or more regions provide exposure light 405, 406 during exposure and one or more other regions provide display content (e.g., a continued display of the scene, exposure data, or the like) during exposure.

Figure 5:
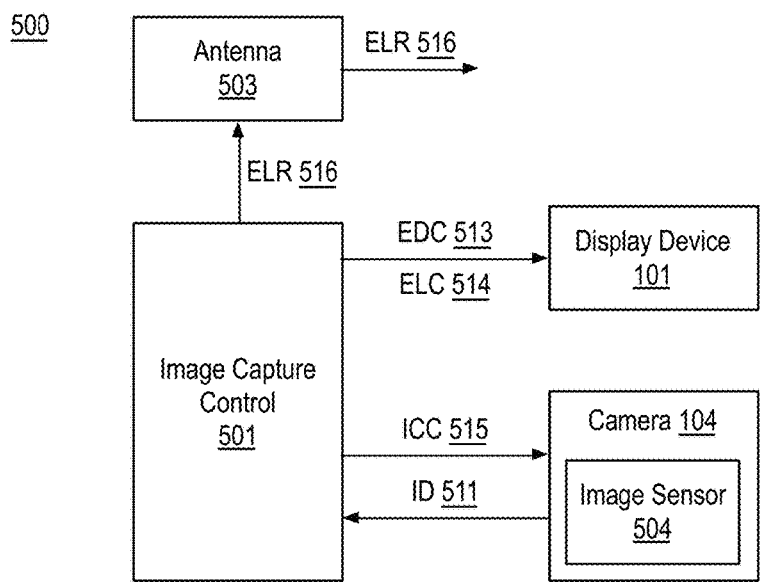
FIG. 5 illustrates an example system for capturing images with exposure light provided by a display device.

FIG. 5 illustrates an example system 500 for capturing images with exposure light provided by a display device, arranged in accordance with at least some implementations of the present disclosure. For example, system 500 may be implemented via device 100 or any other device discussed herein. As shown in FIG. 5, system 500 may include an image capture control module 501, an antenna 503, display device 101, and camera 104 including an image sensor 504. As discussed system 500 may be implemented by any suitable form factor device such as a camera, a smartphone, an ultrabook, a laptop, a wearable device, a tablet, a monitor, or the like.

As shown, image capture control module 501 may receive image data (ID) 511 from camera 104. For example, image sensor 504 may capture images or frames of a scene at an image or frame rate and camera 104, image sensor 504, pre-image processing circuitry, or the like may provide image data 511 corresponding to a scene. Image data 511 may include any suitable image data in any suitable color space. Image capture control module 501 may generate exposure display data (e.g., corresponding to an exposure display pattern such as exposure display pattern 105 or the like) and other exposure settings based on image data 511 and other imaging inputs as available. The exposure display data may be generated at predetermined intervals or in response to an image capture signal (not shown). The exposure display data may be generated using any suitable technique or techniques and the exposure display data may include any suitable data that may provide for an exposure display pattern 105 via display device 101 during image capture. For example, the exposure display data may be provided to display device 101 via an exposure display command signal (EDC) 513 as discussed further below.

In an embodiment, generating the exposure display data may include detecting skin regions in image data 511 and providing a skin tone enhancement color for regions of the exposure display data corresponding to the detected skin regions. In an embodiment, generating the exposure display data may include performing a white balance operation based on image data 511. For example, the exposure display data may have color adjusted regions corresponding to a white balance adjustment pattern corresponding to image data 511. Such skin detection or white balance operations may be performed with respect to one or more images of image data 511. Furthermore, in an embodiment, generating the exposure display data may include providing a pre-exposure light operation with respect to display device 101. For example, the pre-exposure light operation may include providing an all white (or other preselected color) exposure light via display device 101 and performing white balance based on an image or frame of image data 511 corresponding to the pre-exposure light operation. Furthermore, generating the exposure display data may include generating the exposure display data based on other information available to image capture control module 501 such as data from a light detector, data from a infra-red detector, or the like.

As shown, image capture control module 501 may generate exposure display command signal 513, an exposure light command signal (ELC) 514, an image capture command signal (ICC) 515, and/or an exposure light request signal (ELR) 516 to execute an image capture. For example, based on receiving an image capture command (e.g., from a user or the like; not shown), image capture control module 501 may generate image capture settings and provide command signals for executing image capture based on such settings.

For example, in some contexts, such as well lit exposure settings, exposure light via display device 101 may not be needed and image capture control module 501 may provide image capture command signal 515 without sending a corresponding exposure display command signal 513.

In other contexts, image capture control module 501 may generate exposure display command signal 513 corresponding to the exposure display data and exposure light command signal 514 corresponding to a desired intensity of exposure light to be provided by display device 101. In some examples, exposure light command signal 514 may include a pulse light command signal for overdriving display device 101 as is discussed further herein. For example, exposure display command signal 513 may provide a signal to drive a display pattern or image of display device 101 such that an exposure display pattern such as exposure display pattern 105 (please refer to FIG. 1) or the like is provided during exposure. Furthermore, exposure light command signal 514 may provide a desired intensity of exposure light to be provided by display device 101 during exposure.

Also as shown, image capture control module 501 may generate image capture command signal 515, which may command camera 104 to attain an image during the provided exposure light provided by display device 101 as specified by exposure display command signal 513 and exposure light command signal 514. For example, image capture command signal 515, exposure display command signal 513, and exposure light command signal 514 may be synchronized or provide timing signals for display device 101 and camera 104 such that the discussed exposure light from display device 101 and image capture provided by camera 104 are provided during an exposure of a scene.

Furthermore, in some examples, image capture control module 501 may generate exposure light request signal 516, which may be sent to a remote device by antenna 503. For example, exposure light request signal 516 may be provided wirelessly to a remote device such that a display device of the remote device provides additional exposure light during the exposure of the scene (and image capture as provided by camera 104). For example, exposure light request signal 516 may include an indication to the remote device to provide a second exposure light, via a display device of the remote device. For example, a nearby remote device may provide additional exposure light resources for the scene. The flash provided by the remote device may be all one color or in a pattern as discussed with respect to exposure display pattern 105. For example, exposure light request signal 516 may include an exposure intensity, an exposure display pattern, and/or a timing such that the remote device may provide exposure light via a display device of the remote device. Such exposure light from the display device of the remote device may be in addition to the exposure light provided by display device 101 or in the alternative to the exposure light provided by display device 101.

Figure 6:
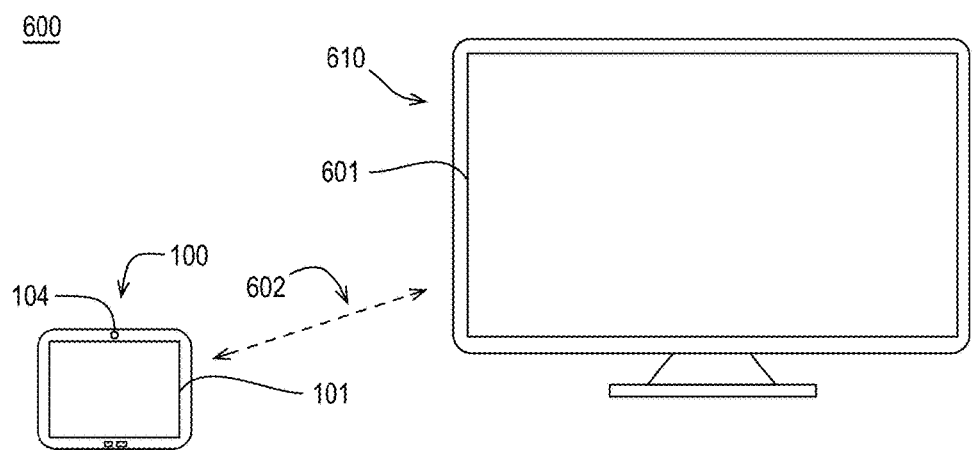
FIG. 6 is an illustrative diagram of an example setting for providing an exposure light request to a remote device.

FIG. 6 is an illustrative diagram of an example setting 600 for providing an exposure light request to a remote device 610, arranged in accordance with at least some implementations of the present disclosure. As shown in FIG. 6, setting 600 may include a local device 100 (illustrated as a tablet in this example) including camera 104 for attaining an image of a scene and a display device 101 for optionally providing exposure light. Furthermore, setting 600 may include a remote device 610 communicatively coupled via wireless communications channel 602. In some examples, device 100 may transmit, via wireless communications channel 602, exposure light request signal 516 or the like to remote device 610. Remote device 610 may exposure light request signal 516 and provide exposure light during an exposure from display device 601. Display device 601 may be any suitable display device discussed herein such as a self light emitting display device, a backlit display device, or the like. Although illustrated with a single remote device 610 communicating via a single wireless communications channel 602, any number of receiving devices, and/or wireless communications channels may be employed in setting 600.

In the illustrated example, remote device 610 is a television. However, remote device 610 may include any device having a display device such as a computer, a laptop, an ultrabook, a smartphones, a tablet, or the like. Wireless communications channel 602 may be any suitable wireless link and communications may be facilitated via any suitable protocol(s) or standard(s). In some examples, wireless communications channel 602 is a Wi-Fi connection based on an Institute of Electrical and Electronics Engineers (IEEE) 802.11 standard such as 802.11a/b/g/n/ac/ad or the like. In other examples, wireless communications channel 602 may be based on an implementation of a Wi-Fi Multimedia (WMM) interoperability standard. In yet further examples, wireless communications channel 602 may provide communications based on wireless display (WiDi) technology and/or based on implementation of a wireless screen casting standard such as a Miracast standard using Wi-Fi direction connections. In an embodiment, wireless communications channel 602 is part of a wireless local area network (WLAN). For example, device 100 and remote device 610 may be in communication prior to initiation of an image capture.

Returning to FIG. 5, camera 104 may capture an image (e.g., a digital image) of a scene during an exposure of the scene. As discussed, the image capture may include an exposure light provided by display device 101 (e.g., optionally including an exposure display pattern and/or optionally overdriven) and/or an exposure light provided by a remote device such as remote device 610. Such imaging techniques may improve the quality of the image attained of the scene during the exposure. As discussed herein, in some embodiments, display device 101 may provide display content during the exposure of the scene such that the user may view (or continue to view) the display content during exposure. Such techniques may provide enhanced user experience during exposure.

Figure 7:
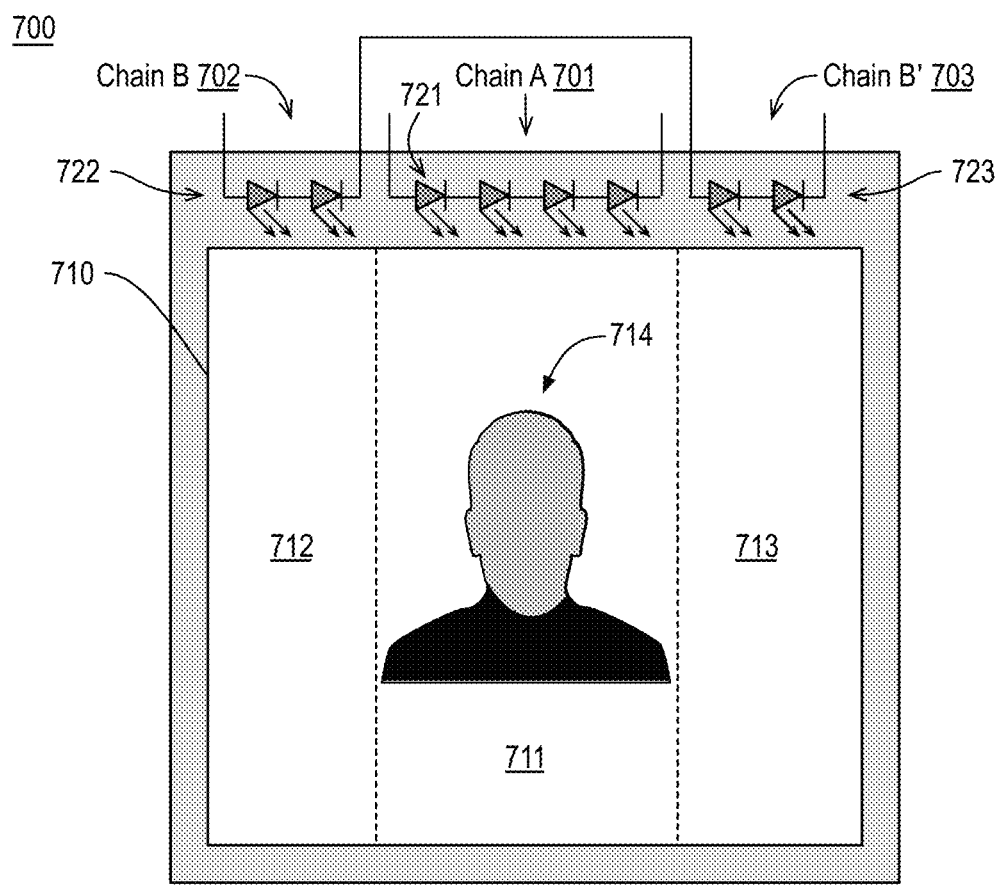
FIG. 7 illustrates an example display device for providing display content during exposure.

FIG. 7 illustrates an example display device 700 for providing display content 714 during exposure, arranged in accordance with at least some implementations of the present disclosure. Display device 700 may be implemented via any device (e.g., device 100) or system (e.g., system 500) discussed herein. As shown in FIG. 7, display device 700 may include a display area 710 having exposure light regions 712, 713 and a display during exposure region 711. Furthermore, display device 700 may include a chain A 701 of light sources 721 on a first circuit and a second circuit including a chain B 702 of light sources 722 and a chain B' 703 of light sources 723. For example, chain A 701 of light sources 721 may be provided on a first circuit such that light sources 721 may be powered together and, similarly, chain B 702 of light sources 722 and a chain B' 703 of light sources 723 may be provided on a second circuit such that light sources 722, 723 may be powered together during exposure.

For example, during an exposure of a scene, display device 700 may provide exposure light via exposure light regions 712, 713 as supported by chain B 702 of light sources 722 and chain B' 703 of light sources 723 and, also during the exposure of the scene, display device 700 may provide display of display content 714 via display during exposure region 711 as supported by chain A 701 of light sources 721. In the illustrated example, display content 714 may provide a display of the scene (or a portion of the scene) being exposed. For example, display content 714 may provide a display of a user being photographed while the photograph is being taken. However, display content 714 may include any suitable content such as content corresponding to the exposure (e.g., a countdown timer, exposure setting information), other content being provided by display device 700 (e.g., a game being played or a website being browsed), or the like. In an embodiment, display content 714 may be selected by a user.

In the illustrated example, display device 700 is partitioned into two exposure light regions 712, 713 supported by a single circuit of light sources 722, 723 and a single display during exposure region 711 supported by a single circuit of light sources 721 such that single display during exposure region 711 is between exposure light regions 712, 713. However, display device 700 may be partitioned into any number of exposure light regions and display during exposure regions supported by any number of circuits of light sources. For example, for handheld device (e.g., tablet and mobile phone) applications, display device 700 may be partitioned into two chains of light sources and, for laptop applications, display device may be partitioned into about four chains of light sources. Furthermore, in the illustrated example, light sources 721, 722, 723 are light emitting diodes. For example, display device 700 may be a liquid crystal display and light sources 721, 722, 723 may be provided by a backlight panel or the like of the liquid crystal display. However, light sources 721, 722, 723 may include any suitable light sources. In an embodiment, display device 700 may be a self light emitting display device such as an organic light emitting diode display and light sources 721, 722, 723 may be self light emitting sources of display device 700. As shown, there may not be overlap between light sources 721, 722, 723 such that none of light sources 722, 723 are in display during exposure region 711 and none of light sources 721 are in exposure light regions 712, 713.

As discussed, during exposure, display device 700 may provide exposure light via exposure light regions 712, 713 and display of display content 714 via display during exposure region 711. Furthermore, exposure display pattern techniques as discussed with respect to exposure display pattern 105 and elsewhere herein may be provided via display device 700. For example, exposure light regions 712, 713 may be provided in different colors or further partitioned into regions for application of different colors, different images, different color gradients, or the like. For example, exposure light regions 712, 713 may implement any exposure display pattern discussed herein.

Figure 8:
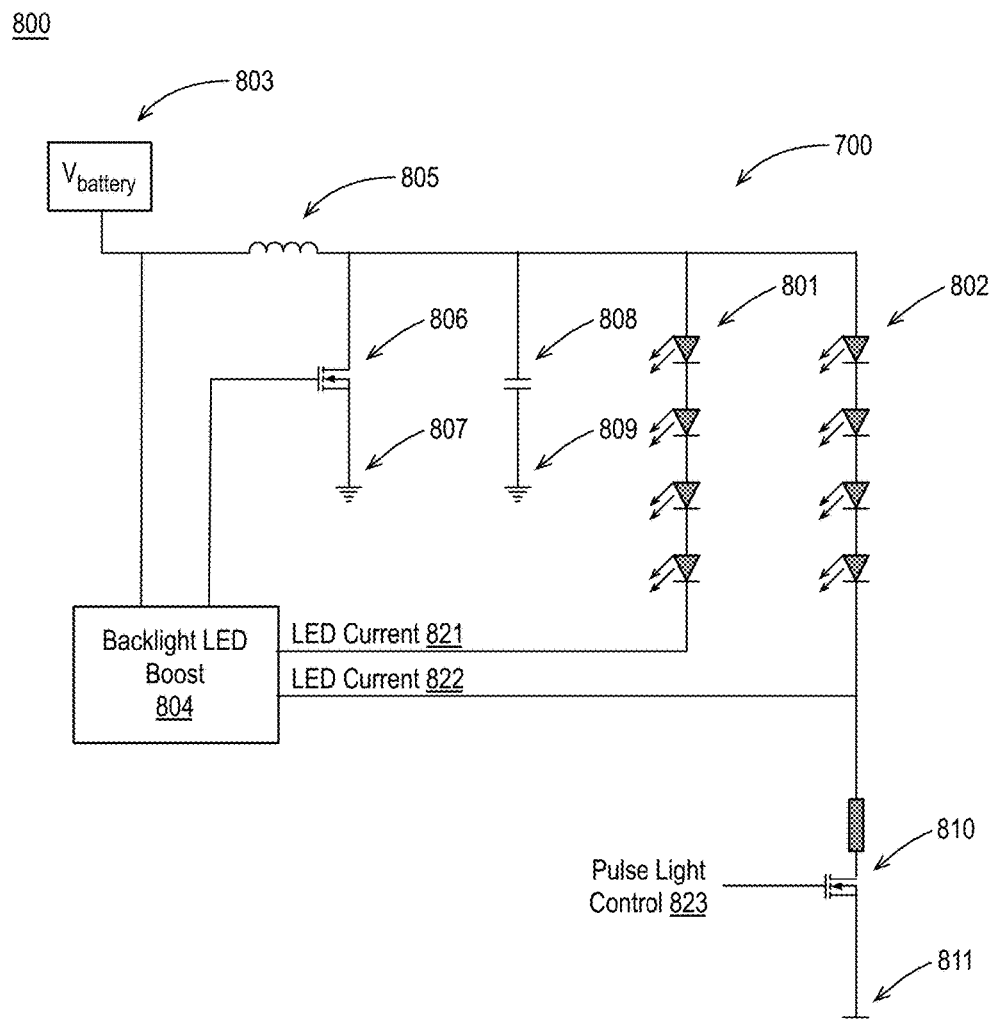
FIG. 8 illustrates example circuitry of the example display device for providing display content during exposure.

FIG. 8 illustrates example circuitry 800 of example display device 700 for providing display content 714 during exposure, arranged in accordance with at least some implementations of the present disclosure. As shown in FIG. 7, circuitry 800 may include a battery 803, a backlight light emitting diode (LED) boost controller 804, an inductor 805, a transistor 806, grounds 807, 809, 811, a capacitor 808 (e.g., having a capacitance, C), light sources 801 on a first circuit coupled to an LED current 821, light sources 802 on a second circuit coupled to an LED current 821 and coupled to a transistor 810 coupled to a pulse light control signal 823.

During display operation (e.g., during normal viewing by a user), backlight light emitting diode boost controller 804 may provide LED currents 821, 822 to provide a selected display intensity from light sources 801, 802. During exposure, one or both of LED currents 821, 822 may be raised to an exposure intensity based on receiving an exposure light command signal (e.g., exposure light command signal 514, please refer to FIG. 5). For example, as discussed with respect to FIG. 7, light sources 801 may support a display during exposure region (e.g., display during exposure region 711) and light sources 802 may support one or more exposure light regions (e.g., exposure light regions 712, 713). In some examples, sufficient exposure light may be provided by increasing LED currents 821, 822 to those within a maximum display intensity as provided by LED currents 821, 822.

In other exposure contexts, a maximum display intensity as provided by LED currents 821, 822 may not provide sufficient exposure light. In such examples, pulse light control signal 823 may be provided from backlight light emitting diode boost controller 804 or image capture control module 501 (please refer to FIG. 5). Assertion of pulse light control signal 823 to transistor 810 may provide a connection to ground for light sources 802 and capacitor 808, which may discharge and overdrive light sources 802 providing a pulsed exposure light during exposure as discussed herein. For example, the pulsed exposure light may be provided by light sources 802 in an exposure region or regions (e.g., exposure light regions 712, 713) of display device 700. For example, the pulsed exposure light may overdrive light sources 802 with respect to LED current 822. Furthermore, during such pulse exposure light, light sources 801 may not be overdriven and may continue to provide display level lighting based on LED current 821. Using such techniques, display content may be provided via a display during exposure region (e.g., display during exposure region 711) as supported by light sources 802 and pulse exposure light may be provided via exposure region or regions (e.g., exposure light regions 712, 713).

FIG. 8 illustrates circuitry 800 for supporting display of display content and pulse exposure light during exposure. In some embodiments, pulse exposure light may be provided independent of providing display content during exposure. For example, all light sources for display device 700 may be provided on a single circuit such that during assertion of pulse light control signal 823, all light sources of display device 700 may be overdriven to provide a pulse exposure light. In yet other examples, multiple capacitors may be provided to support multiple circuits of light sources such that all such circuits of light sources may be overdriven to provide a pulse exposure light during exposure. Furthermore, display device 700 may support exposure display patterning as discussed herein.

FIG. 8 illustrates circuitry 800 such that light sources 801, 802 may be light emitting diodes or the like. For example, as discussed, display device 700 may be a liquid crystal display and light sources 801, 802 may be provided by a backlight panel or the like of the liquid crystal display. However, light sources 801, 802 may include any suitable light sources. In an embodiment, display device 700 may be a self light emitting display device such as an organic light emitting diode display and light sources 801, 802 may be self light emitting sources of display device 700.

Figure 9:
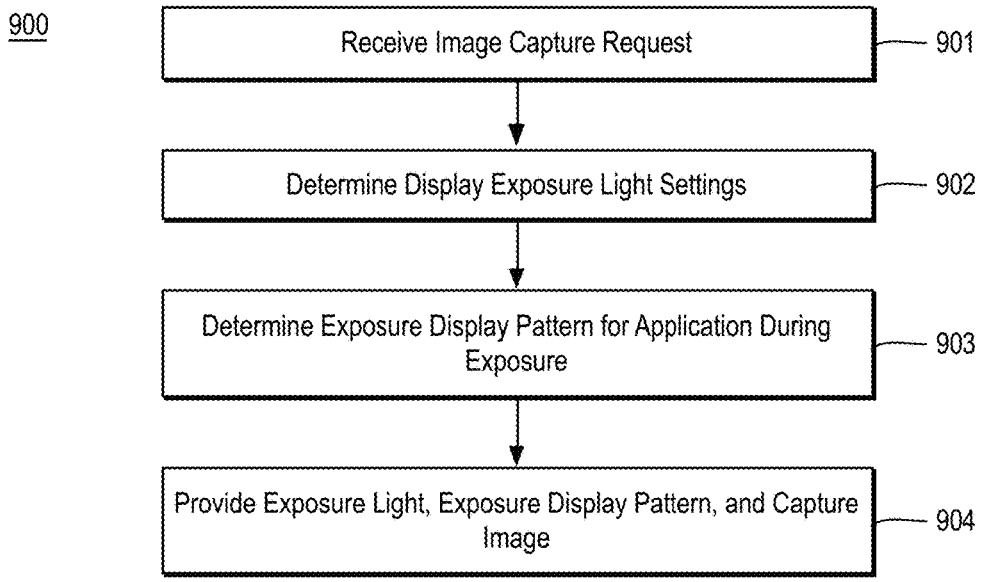
FIG. 9 is a flow diagram illustrating an example process for capturing images using exposure light from a display device.

FIG. 9 is a flow diagram illustrating an example process 900 for capturing images using exposure light from a display device, arranged in accordance with at least some implementations of the present disclosure. For example, process

900 may provide an image capture sequence. Process 900 may include one or more operations 901-904 as illustrated in FIG. 9. Process 900 may form at least part of a technique for capturing images using exposure light using a display. By way of non-limiting example, process 900 may form at least part of a technique for providing exposure light using a display as performed by any device or system discussed herein. Furthermore, process 900 will be described herein with reference to system 1000 of FIG. 10.

Figure 10:
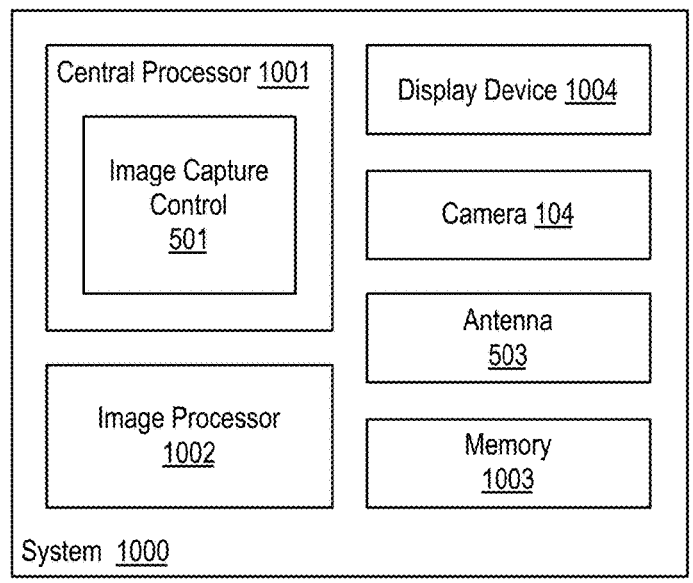
FIG. 10 is an illustrative diagram of an example system for capturing images using exposure light from a display device.

FIG. 10 is an illustrative diagram of an example system 1000 for capturing images using exposure light from a display device, arranged in accordance with at least some implementations of the present disclosure. As shown in FIG. 10, system 1000 may include a central processor 1001, an image processor 1002, a memory 1003, a display device 1004 (which may include any display device discussed herein), camera 104, and antenna 503. Also as shown, central processing units 1001 may include or implement image capture controller 501. For example, image capture control module 501 may be implemented to perform operations as discussed herein. In the example of system 1000, memory 1003 may store image data, exposure light control parameters, exposure display pattern data, exposure display command signals or data, exposure light command signals or data, image capture command signals or data, exposure light request signals or data, or any other data discussed herein. In an embodiment, central processor 1001, image processor 1002, memory 1003, display device 1004, camera 104, and antenna 503 may be mounted within a housing of system 1000. In an embodiment, camera 104 may have a facing direction aligned with a display direction of display device 1004.

As shown, in some examples, image capture control module 501 may be implemented via central processor 1001. In other examples, image capture control module 501 or portions thereof may be implemented via image processor 1002 or a graphics processing unit. In yet other examples, image capture control module 501 or portions thereof may be implemented via an imaging processing pipeline or unit.

Image processor 1002 may include any number and type of graphics or image processing units that may provide the operations as discussed herein. In some examples, image processor 1002 may be an image signal processor. Such operations may be implemented via software or hardware or a combination thereof. For example, image processor 1002 may include circuitry dedicated to manipulate image data obtained from memory 1003. Central processor 1001 may include any number and type of processing units or modules that may provide control and other high level functions for system 1000 and/or provide any operations as discussed herein. Memory 1003 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory 1003 may be implemented by cache memory.

In an embodiment, image capture control module 501 or portions thereof may be implemented via an execution unit (EU) of image processor 1002. The EU may include, for example, programmable logic or circuitry such as a logic core or cores that may provide a wide array of programmable logic functions. In an embodiment, image capture control module 501 or portions thereof may be implemented via dedicated hardware such as fixed function circuitry or the like. Fixed function circuitry may include dedicated logic or circuitry and may provide a set of fixed function entry points that may map to the dedicated logic for a fixed purpose or function. In some embodiments, image capture control module 501 or portions thereof may be implemented via an application specific integrated circuit (ASIC). The ASIC may include an integrated circuitry customized to perform the operations discussed herein.

Returning to discussion of FIG. 9, process 900 may begin at operation 901, where an image capture request may be received. The image capture request may be received using any suitable technique or techniques. For example, image capture control module 501 as implemented via central processor 1001 may receive the image capture request from a user (e.g., via an input device such as a button or touch screen selection), from another component or module of system 1000, or the like. For example, the image capture request may initiate an image capture protocol or the like to capture an image of a scene.

Processing may continue at operation 902, where display exposure light settings may be determined. The display exposure light settings may be determined using any suitable technique or techniques. In an embodiment, image capture control module 501 as implemented via central processor 1001 may determine the exposure light settings. The exposure light settings may include any suitable settings to be performed by a display device as discussed herein For example, the exposure light settings may include an exposure light intensity, an exposure light duration, and the like. In an embodiment, the exposure light settings may be determined by analyzing a preview image of the scene.

Processing may continue at operation 903, where an exposure display pattern may be determined for application during exposure. The exposure display pattern may be determined using any suitable technique or techniques. In an embodiment, image capture control module 501 as implemented via central processor 1001 may determine the exposure display pattern. As discussed, the exposure display pattern may include any suitable pattern of any suitable colors and the exposure display pattern may be determined for application during exposure of a scene. In an embodiment, the exposure display pattern may include a first color for a first region of a display device and a second color for a second region of the display device for application during an exposure of a scene. For example, the first and second colors may be different.

In an embodiment, determining the exposure display pattern may include performing a white balance operation based on one or more preview images of the scene. For example, the exposure display pattern may be provided to improve white balance of the scene. In an embodiment, determining the exposure display pattern may include performing a skin detection operation, a facial recognition operation, a human recognition operation, or the like based on one or more preview images of the scene. For example, the exposure display pattern may provide skin enhancement colors or tones corresponding to detected skin regions. In an embodiment, the exposure display pattern may include more than two colors. For example, the exposure display pattern may include any number of regions of different colors and/or any patterns.

Processing may continue at operation 904, where the exposure light and exposure display pattern may be provided, via a display device, during exposure and an image of the scene may be captured. For example, application of the exposure light and exposure display pattern may be responsive to an exposure display command provided from image capture control module 501 to display device 1004. The exposure light and exposure display pattern may be provided using any suitable technique or techniques. For example, providing the exposure light during the exposure of the scene may include setting a first region of the display device to the first color and a second region of the display device to the second color during the exposure as defined by the exposure display pattern. In an embodiment, providing the exposure light may include setting a third region of the display device to a third color and/or providing a pattern via the display device. Furthermore, the image may be capture using any suitable technique or techniques. In an embodiment, camera 104 may capture the image during the exposure. For example, image capture may be responsive to an image capture command provided from image capture control module 501 to camera 104.

For example, the exposure light and the exposure display pattern may be provided via display device 1004 of system 1000. Display device 1004, as discussed, may include any display device discussed herein. In an embodiment, display device 1004 may be a light emitting diode backlit display device, a self light emitting display device, or the like. In an embodiment, display device 1004 may be an organic light emitting diode display and setting the first region to the first color and the second region to the second color may include providing the first and second colors via the exposure light. For example, in such organic light emitting diode displays the exposure light and exposure display pattern may be provided via the same light source. In an embodiment, display device 1004 may be a liquid crystal display, setting the first region to the first color and the second region to the second color may include providing the first and second colors via a liquid crystal panel component of the liquid crystal display, and providing the exposure light may include providing the exposure light via a backlight component of the liquid crystal display.

As discussed, in addition or in the alternative to providing an exposure display pattern as discussed, providing the exposure light may include overdriving a light source of the display device to provide a pulsed exposure light during the exposure. For example, the pulsed exposure light may have an exposure intensity that exceeds a maximum display intensity of the light source. In an embodiment, display device 1004 may be an organic light emitting diode display and overdriving the light source of the organic light emitting diode display may include overdriving self light emitting elements of the organic light emitting diode display. In an embodiment, display device 1004 may be a liquid crystal display and overdriving the light source of the liquid crystal display may include overdriving light emitting diodes of a backlight panel of the liquid crystal display.

Furthermore, in addition or in the alternative to providing an exposure display pattern, display content may be provided by the display device during the exposure of the scene. The display content may be provided using any suitable technique or techniques. In an embodiment, the display content may be provided in a third region of the display device separate from the discussed first and second regions. In an embodiment, the display content may be provided in a third region of display device 1004. In an embodiment, the first region and, optionally the second region, may include a first chain of first light sources on a first circuit and the third region may include a second chain of second light sources on a second circuit. For example, no second light source may be in the first region and no first light source may be in the second region.

Furthermore, in addition to or in the alternative to providing exposure light by display device 1004 of system 1000, system 1000 may provide an exposure light request to a remote device. The exposure light request may be provided to the remote device using any suitable technique or techniques. In an embodiment, an exposure light request may be transmitted to a second display device such that the exposure light request comprises an indication to the second display device to provide a second exposure light, via the second display device, during the exposure of the scene. In response to the exposure light request, the second display device may provide second exposure light during the exposure of the scene.

As discussed, process 900 may provide for exposure light settings and an exposure display pattern for implementation during image capture. In an embodiment, multiple (e.g., 2 or more) combinations of exposure light settings and/or exposure display patterns may be generated and used during multiple image captures. The multiple images may be combined to form a single final image or the multiple images may be saved for presentment to a user.

Process 900 may be repeated any number of times for any number of image capture operations for still images or the like. Process 900 may provide for high quality captured image data. Such captured image data may be stored, displayed to a user, or processed using any suitable image processing techniques.

The techniques discussed with respect to FIG. 9 and elsewhere herein may provide adjustments to the color of emitted light during exposure to spatially optimize white balance and/or skin tone of the subject(s) during image capture. Furthermore, as discussed, the exposure light may be boosted to provide better illumination during image capture.

Various components of the systems described herein may be implemented in software, firmware, and/or hardware and/or any combination thereof. For example, various components of the devices or systems discussed herein may be provided, at least in part, by hardware of a computing System-on-a-Chip (SoC) such as may be found in a multi-function device or a computing system such as, for example, a laptop computer, a tablet, or a smart phone. Those skilled in the art may recognize that systems described herein may include additional components that have not been depicted in the corresponding figures.

While implementation of the example processes discussed herein may include the undertaking of all operations shown in the order illustrated, the present disclosure is not limited in this regard and, in various examples, implementation of the example processes herein may include only a subset of the operations shown, operations performed in a different order than illustrated, or additional operations.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more graphics processing unit(s) or processor core(s) may undertake one or more of the blocks of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions thereof, or any other module or component as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 11:
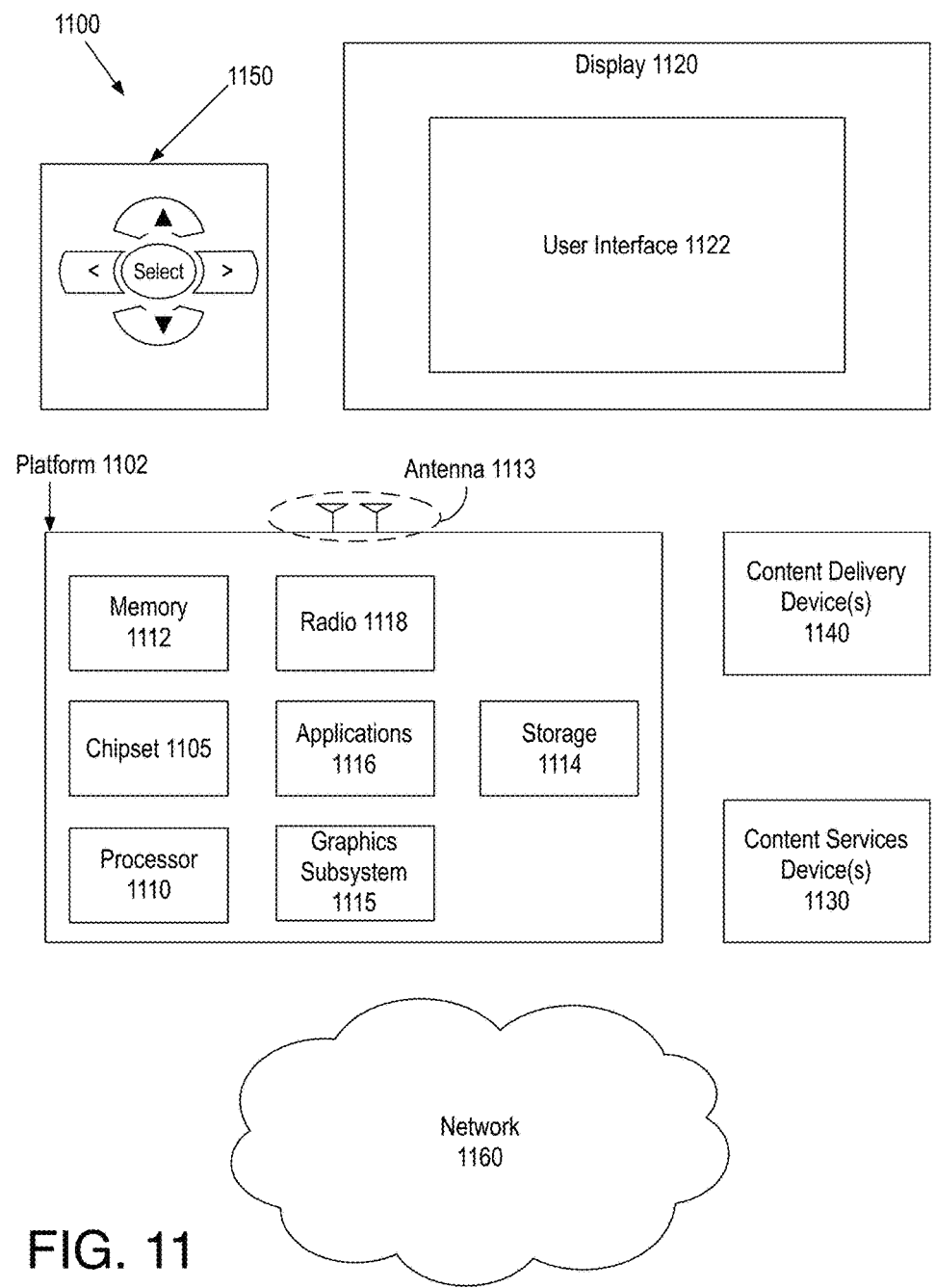
FIG. 11 is an illustrative diagram of an example system.

FIG. 11 is an illustrative diagram of an example system 1100, arranged in accordance with at least some implementations of the present disclosure. In various implementations, system 1100 may be a media system although system 1100 is not limited to this context. For example, system 1100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 1100 includes a platform 1102 coupled to a display 1120. Platform 1102 may receive content from a content device such as content services device(s) 1130 or content delivery device(s) 1140 or other similar content sources. A navigation controller 1150 including one or more navigation features may be used to interact with, for example, platform 1102 and/or display 1120. Each of these components is described in greater detail below.

In various implementations, platform 1102 may include any combination of a chipset 1105, processor 1110, memory 1112, antenna 1113, storage 1114, graphics subsystem 1115, applications 1116 and/or radio 1118. Chipset 1105 may provide intercommunication among processor 1110, memory 1112, storage 1114, graphics subsystem 1115, applications 1116 and/or radio 1118. For example, chipset 1105 may include a storage adapter (not depicted) capable of providing intercommunication with storage 1114.

Processor 1110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1110 may be dual-core processor(s), dual-core mobile processor(s), and so forth.

Memory 1112 may be implemented as a volatile memory device such as, but not limited to, a Random Access Memory (RAM), Dynamic Random Access Memory (DRAM), or Static RAM (SRAM).

Storage 1114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1114 may include technology to increase the storage performance enhanced protection for valuable digital media when multiple hard drives are included, for example.

Graphics subsystem 1115 may perform processing of images such as still or video for display. Graphics subsystem 1115 may be a graphics processing unit (GPU) or a visual processing unit (VPU), for example. An analog or digital interface may be used to communicatively couple graphics subsystem 1115 and display 1120. For example, the interface may be any of a High-Definition Multimedia Interface, DisplayPort, wireless HDMI, and/or wireless HD compliant techniques. Graphics subsystem 1115 may be integrated into processor 1110 or chipset 1105. In some implementations, graphics subsystem 1115 may be a stand-alone device communicatively coupled to chipset 1105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1118 may operate in accordance with one or more applicable standards in any version.

In various implementations, display 1120 may include any television type monitor or display. Display 1120 may include, for example, a computer display screen, touch screen display, video monitor, television-like device, and/or a television. Display 1120 may be digital and/or analog. In various implementations, display 1120 may be a holographic display. Also, display 1120 may be a transparent surface that may receive a visual projection. Such projections may convey various forms of information, images, and/or objects. For example, such projections may be a visual overlay for a mobile augmented reality (MAR) application. Under the control of one or more software applications 1116, platform 1102 may display user interface 1122 on display 1120. Furthermore, display 1120 may be any display device or may include any components of any display device discussed herein.

In various implementations, content services device(s) 1130 may be hosted by any national, international and/or independent service and thus accessible to platform 1102 via the Internet, for example. Content services device(s) 1130 may be coupled to platform 1102 and/or to display 1120. Platform 1102 and/or content services device(s) 1130 may be coupled to a network 1160 to communicate (e.g., send and/or receive) media information to and from network 1160. Content delivery device(s) 1140 also may be coupled to platform 1102 and/or to display 1120.

In various implementations, content services device(s) 1130 may include a cable television box, personal computer, network, telephone, Internet enabled devices or appliance capable of delivering digital information and/or content, and any other similar device capable of uni-directionally or bi-directionally communicating content between content providers and platform 1102 and/display 1120, via network 1160 or directly. It will be appreciated that the content may be communicated uni-directionally and/or bi-directionally to and from any one of the components in system 1100 and a content provider via network 1160. Examples of content may include any media information including, for example, video, music, medical and gaming information, and so forth.

Content services device(s) 1130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1102 may receive control signals from navigation controller 1150 having one or more navigation features. The navigation features of controller 1150 may be used to interact with user interface 1122, for example. In various embodiments, navigation controller 1150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 1150 may be replicated on a display (e.g., display 1120) by movements of a pointer, cursor, focus ring, or other visual indicators displayed on the display. For example, under the control of software applications 1116, the navigation features located on navigation controller 1150 may be mapped to virtual navigation features displayed on user interface 1122, for example. In various embodiments, controller 1150 may not be a separate component but may be integrated into platform 1102 and/or display 1120. The present disclosure, however, is not limited to the elements or in the context shown or described herein.

In various implementations, drivers (not shown) may include technology to enable users to instantly turn on and off platform 1102 like a television with the touch of a button after initial boot-up, when enabled, for example. Program logic may allow platform 1102 to stream content to media adaptors or other content services device(s) 1130 or content delivery device(s) 1140 even when the platform is turned "off." In addition, chipset 1105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1100 may be integrated. For example, platform 1102 and content services device(s) 1130 may be integrated, or platform 1102 and content delivery device(s) 1140 may be integrated, or platform 1102, content services device(s) 1130, and content delivery device(s) 1140 may be integrated, for example. In various embodiments, platform 1102 and display 1120 may be an integrated unit. Display 1120 and content service device(s) 1130 may be integrated, or display 1120 and content delivery device(s) 1140 may be integrated, for example. These examples are not meant to limit the present disclosure.

In various embodiments, system 1100 may be implemented as a wireless system, a wired system, or a combination of both. When implemented as a wireless system, system 1100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 11.

Figure 12:
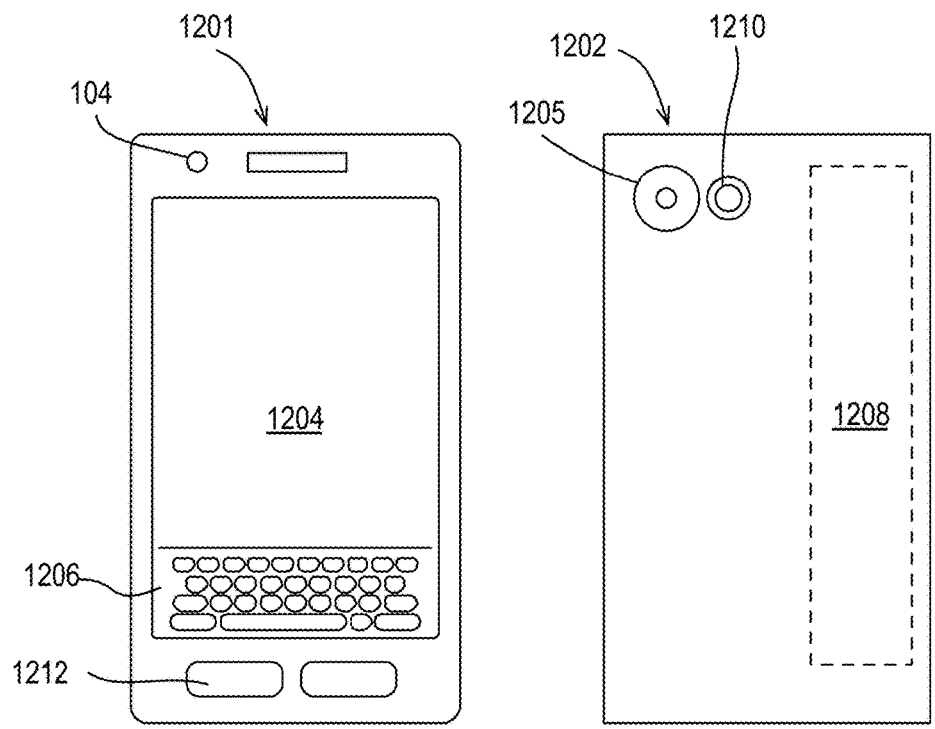
FIG. 12 illustrates an example small form factor device, all arranged in accordance with at least some implementations of the present disclosure.

As described above, system 1100 may be embodied in varying physical styles or form factors. FIG. 12 illustrates an example small form factor device 1200, arranged in accordance with at least some implementations of the present disclosure. In some examples, system 1100 may be implemented via device 1200. In other examples, any device, system, or portions thereof may be implemented via device 1200. In various embodiments, for example, device 1200 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smart phone, smart tablet or smart mobile television), mobile internet device (MID), messaging device, data communication device, cameras, and so forth.

Examples of a mobile computing device also may include computers that are arranged to be worn by a person, such as a wrist computers, finger computers, ring computers, eyeglass computers, belt-clip computers, arm-band computers, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 12, device 1200 may include a housing with a front 1201 and a back 1202. Device 1200 includes a display 1204, an input/output (I/O) device 1206, and an integrated antenna 1208. Device 1200 also may include navigation features 1212. I/O device 1206 may include any suitable I/O device for entering information into a mobile computing device. Examples for I/O device 1206 may include an alphanumeric keyboard, a numeric keypad, a touch pad, input keys, buttons, switches, microphones, speakers, voice recognition device and software, and so forth. Information also may be entered into device 1200 by way of microphone (not shown), or may be digitized by a voice recognition device. As shown, device 1200 may include a camera 1205 (e.g., including a lens, an aperture, and an imaging sensor), and a flash 1210 integrated into back 1202 (or elsewhere) of device 1200. Furthermore, device 1200 may include camera 104 having a facing direction aligned with a display direction of display 1204. Display 1204 may be any display device or may include any components of any display device discussed herein. For example, display 1204 may provide exposure light during image capture as discussed herein.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one or more first embodiments, a method for capturing images by a device comprises determining a first color for a first region of a display device and a second color for a second region of the display device for application during an exposure of a scene, providing, via the display device, exposure light during the exposure of the scene, wherein providing the exposure light comprises setting the first region of the display device to the first color and the second region of the display device to the second color during the exposure, and capturing an image of the scene during the exposure.

Further to the first embodiments, providing the exposure light during the exposure comprise overdriving a light source of the display device to provide a pulsed exposure light during the exposure, wherein the pulsed exposure light has an exposure intensity that exceeds a maximum display intensity of the display device.

Further to the first embodiments, the display device comprises at least one of a light emitting diode backlit display device or a self light emitting display device.

Further to the first embodiments, the display device comprises an organic light emitting diode display and setting the first region to the first color and the second region to the second color comprises providing the first and second colors via the exposure light.

Further to the first embodiments, the display device comprises a liquid crystal display, setting the first region to the first color and the second region to the second color comprises providing the first and second colors via a liquid crystal panel component of the liquid crystal display, and providing the exposure light comprises providing the exposure light via a backlight component of the liquid crystal display.

Further to the first embodiments, the method further comprises providing, via the display device and during the exposure of the scene, display content, wherein the display content is provided in a third region of the display device.

Further to the first embodiments, the method further comprises providing, via the display device and during the exposure of the scene, display content, wherein the display content is provided in a third region of the display device, wherein the first region comprises a first chain of first light sources on a first circuit and the third region comprises a second chain of second light sources on a second circuit, and wherein no second light sources are in the first region and no first light sources are in the third region.

Further to the first embodiments, the method further comprises transmitting an exposure light request to a second display device, wherein the exposure light request comprises an indication to the second display device to provide a second exposure light, via the second display device, during the exposure of the scene.

Further to the first embodiments, capturing the image of the scene comprises capturing the image by a camera having a facing direction aligned with a display direction of the display device.

Further to the first embodiments, determining the first color and the second color comprises at least one of performing a white balance operation or performing a skin detection operation based on a preview image of the scene.

Further to the first embodiments, providing the exposure light comprises at least one of setting a third region of the display device to a third color or providing a pattern via the display device.

In one or more second embodiments, a system for capturing images by comprises a display device, a camera, and an image processor, the image processor to determine a first color for a first region of the display device and a second color for a second region of the display device for application during an image capture of a scene, the display device to provide exposure light during the image capture of the scene, wherein the display device to provide the exposure light comprises the display device to set the first region to the first color and the second region to the second color during the image capture, and the camera to capture an image of the scene during the exposure.

Further to the second embodiments, the display device to provide the exposure light during the exposure comprises the display device to provide a pulsed exposure light during the exposure, wherein the pulsed exposure light has an exposure intensity that exceeds a maximum display intensity of the display device.

Further to the second embodiments, the display device comprises at least one of a light emitting diode backlit display device or a self light emitting display device.

Further to the second embodiments, the display device comprises an organic light emitting diode display and the display device to set the first region to the first color and the second region to the second color comprises the display device provide the first and second colors via the exposure light.

Further to the second embodiments, the display device comprises a liquid crystal display, the display device to set the first region to the first color and the second region to the second color comprises the display device to provide the first and second colors via a liquid crystal panel component of the liquid crystal display, and the display device to provide the exposure light comprises the display device to provide the exposure light via a backlight component of the liquid crystal display.

Further to the second embodiments, the display device is to, during the exposure of the scene, provide display content, wherein the display content is provided in a third region of the display device.

Further to the second embodiments, the display device is to, during the exposure of the scene, provide display content, wherein the display content is provided in a third region of the display device, wherein the first region comprises a first chain of first light sources on a first circuit and the third region comprises a second chain of second light sources on a second circuit, wherein no second light sources are in the first region and no first light sources are in the third region.

Further to the second embodiments, the display device is to, during the exposure of the scene, provide display content, wherein the display content is provided in a third region of the display device, and wherein the first region comprises a first chain of first light sources on a first circuit and the third region comprises a second chain of second light sources on a second circuit, wherein no second light sources are in the first region and no first light sources are in the third region.

Further to the second embodiments, the system further comprises an antenna to transmit an exposure light request to a second display device, wherein the exposure light request comprises an indication to the second display device to provide a second exposure light, via the second display device, during the exposure of the scene.

Further to the second embodiments, the display device, the camera, and the image processor are mounted in a housing and the camera has a facing direction aligned with a display direction of the display device.

Further to the second embodiments, the image processor to determine the first color and the second color comprises the image processor to perform at least one of a white balance operation or a skin detection operation based on a preview image of the scene.

Further to the second embodiments, the display device to provide the exposure light comprises at least one of the display device to set a third region of the display device to a third color or the display device to provide a pattern via the display device.

In one or more third embodiments, a system comprises means for determining a first color for a first region and a second color for a second region for application during an exposure of a scene, means for providing exposure light during the exposure of the scene, wherein the means for providing the exposure light comprise means for setting the first region to the first color and the second region to the second color during the exposure, and means for capturing an image of the scene during the exposure.

Further to the third embodiments, the means for providing the exposure light during the exposure comprise means for overdriving a light source to provide a pulsed exposure light during the exposure, wherein the pulsed exposure light has an exposure intensity that exceeds a maximum display intensity of the light source.

Further to the third embodiments, the system further comprises means for providing, during the exposure of the scene, display content, wherein the display content.

Further to the third embodiments, the system further comprises means for transmitting an exposure light request to a second display device, wherein the exposure light request comprises an indication to the second display device to provide a second exposure light, via the second display device, during the exposure of the scene.

Further to the third embodiments, the means for determining the first color and the second color comprise at least one of means for performing a white balance operation or means for performing a skin detection operation based on a preview image of the scene.

In one or more fourth embodiments, at least one machine readable medium comprises a plurality of instructions that, in response to being executed on a device, cause the device to capture an image by determining a first color for a first region of a display device and a second color for a second region of the display device for application during an exposure of a scene, providing an exposure display command to a display device to provide, via the display device, exposure light during the exposure of the scene, wherein the exposure display command comprises setting the first region of the display device to the first color and the second region of the display device to the second color during the exposure, and providing an image capture command to a camera to capture an image of the scene during the exposure.

Further to the fourth embodiments, the exposure display command comprises a command to overdrive a light source of the display device to provide a pulsed exposure light during the exposure, wherein the pulsed exposure light has an exposure intensity that exceeds a maximum display intensity of the light source.

Further to the fourth embodiments, the exposure display command comprises a command to provide, via the display device and during the exposure of the scene, display content, wherein the display content is provided in a first region of the display device and the exposure light is provided in a second region of the display device.

Further to the fourth embodiments, the machine readable medium further comprising instructions that, in response to being executed on the device, cause the device to capture the image by transmitting an exposure light request to a second display device, wherein the exposure light request comprises an indication to the second display device to provide a second exposure light, via the second display device, during the exposure of the scene.

Further to the fourth embodiments, determining the first color and the second color comprises performing a white balance operation or performing a skin detection operation based on a preview image of the scene.

In one or more fifth embodiments, at least one machine readable medium may include a plurality of instructions that in response to being executed on a computing device, causes the computing device to perform a method according to any one of the above embodiments.

In one or more sixth embodiments, an apparatus may include means for performing a method according to any one of the above embodiments.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A method for capturing images by a device comprising:
    determining a first color for a first region of a display device and a second color for a second region of the display device for application during an exposure of a scene;
    transmitting an exposure light request to a second display device, wherein the exposure light request comprises an indication to the second display device to provide a second exposure light, via the second display device, during the exposure of the scene;
    providing, via the display device, exposure light during the exposure of the scene, wherein providing the exposure light comprises setting the first region of the display device to the first color and the second region of the display device to the second color during the exposure; and
    capturing an image of the scene during the exposure.

2. The method of claim 1, wherein providing the exposure light during the exposure comprise overdriving a light source of the display device to provide a pulsed exposure light during the exposure, wherein the pulsed exposure light has an exposure intensity that exceeds a maximum display intensity of the light source.

3. The method of claim 1, wherein the display device comprises at least one of a light emitting diode backlit display device or a self light emitting display device.

4. The method of claim 1, wherein the display device comprises an organic light emitting diode display and setting the first region to the first color and the second region to the second color comprises providing the first and second colors via the exposure light.

5. The method of claim 1, wherein the display device comprises a liquid crystal display, setting the first region to the first color and the second region to the second color comprises providing the first and second colors via a liquid crystal panel component of the liquid crystal display, and providing the exposure light comprises providing the exposure light via a backlight component of the liquid crystal display.

6. The method of claim 1, further comprising:
    providing, via the display device and during the exposure of the scene, display content, wherein the display content is provided in a third region of the display device.

7. The method of claim 6, wherein the first region comprises a first chain of first light sources on a first circuit and the third region comprises a second chain of second light sources on a second circuit, wherein no second light sources are in the first region and no first light sources are in the third region.

8. The method of claim 1, wherein capturing the image of the scene comprises capturing the image by a camera having a facing direction aligned with a display direction of the display device.

9. The method of claim 1, wherein determining the first color and the second color comprises at least one of performing a white balance operation or performing a skin detection operation based on a preview image of the scene.

10. The method of claim 1, wherein providing the exposure light comprises at least one of setting a third region of the display device to a third color or providing a pattern via the display device.

11. A system for capturing images by comprising:
    a display device;
    a camera;
    an image processor, the image processor to determine a first color for a first region of the display device and a second color for a second region of the display device for application during an exposure of a scene; and
    an antenna to transmit an exposure light request to a second display device, wherein the exposure light request comprises an indication to the second display device to provide a second exposure light, via the second display device, during the exposure of the scene, the display device to provide exposure light during the exposure of the scene, wherein the display device to provide the exposure light comprises the display device to set the first region to the first color and the second region to the second color during the exposure, and the camera to capture an image of the scene during the exposure.

12. The system of claim 11, wherein the display device to provide the exposure light during the exposure comprises the display device to provide a pulsed exposure light during the exposure, wherein the pulsed exposure light has an exposure intensity that exceeds a maximum display intensity of the display device.

13. The system of claim 11, wherein the display device comprises an organic light emitting diode display and the display device to set the first region to the first color and the second region to the second color comprises the display device provide the first and second colors via the exposure light.

14. The system of claim 11, wherein the display device comprises a liquid crystal display, the display device to set the first region to the first color and the second region to the second color comprises the display device to provide the first and second colors via a liquid crystal panel component of the liquid crystal display, and the display device to provide the exposure light comprises the display device to provide the exposure light via a backlight component of the liquid crystal display.

15. The system of claim 11, wherein the display device is to, during the exposure of the scene, provide display content, wherein the display content is provided in a third region of the display device.

16. The system of claim 15, wherein the first region comprises a first chain of first light sources on a first circuit and the third region comprises a second chain of second light sources on a second circuit, wherein no second light sources are in the first region and no first light sources are in the third region.

17. The system of claim 11, wherein the display device, the camera, and the image processor are mounted in a housing and the camera has a facing direction aligned with a display direction of the display device.

18. At least one non-transitory machine readable medium comprising a plurality of instructions that, in response to being executed on a device, cause the device to capture an image by:
  determining a first color for a first region of a display device and a second color for a second region of the display device for application during an exposure of a scene;
  transmitting an exposure light request to a second display device, wherein the exposure light request comprises an indication to the second display device to provide a second exposure light, via the second display device, during the exposure of the scene;
  providing an exposure display command to a display device to provide, via the display device, exposure light during the exposure of the scene, wherein the exposure display command comprises setting the first region of the display device to the first color and the second region of the display device to the second color during the exposure; and
  providing an image capture command to a camera to capture an image of the scene during the exposure.

19. The non-transitory machine readable medium of claim 18, wherein the exposure display command comprises a command to overdrive a light source of the display device to provide a pulsed exposure light during the exposure, wherein the pulsed exposure light has an exposure intensity that exceeds a maximum display intensity of the light source.

20. The non-transitory machine readable medium of claim 18, wherein the exposure display command comprises a command to provide, via the display device and during the exposure of the scene, display content, wherein the display content is provided in a first region of the display device and the exposure light is provided in a second region of the display device.

21. The non-transitory machine readable medium of claim 18, wherein determining the first color and the second color comprises performing a white balance operation or performing a skin detection operation based on a preview image of the scene.

* * * * *